(12) United States Patent
Khadilkar et al.

(10) Patent No.: US 11,061,719 B2
(45) Date of Patent: Jul. 13, 2021

(54) HIGH AVAILABILITY CLUSTER MANAGEMENT OF COMPUTING NODES

(71) Applicant: SAP SE, Walldorf (DE)

(72) Inventors: Mandar Khadilkar, San Jose, CA (US); Prajakta Saket Dandawate, Los Gatos, CA (US); Mudit Srivastava, Berlin (DE); Daniel Culp, San Jose, CA (US)

(73) Assignee: SAP SE, Walldorf (DE)

( * ) Notice: Subject to any disclaimer, the term of this patent is extended or adjusted under 35 U.S.C. 154(b) by 91 days.

(21) Appl. No.: 16/269,511

(22) Filed: Feb. 6, 2019

(65) Prior Publication Data

US 2020/0210231 A1  Jul. 2, 2020

Related U.S. Application Data

(60) Provisional application No. 62/785,448, filed on Dec. 27, 2018.

(51) Int. Cl.
| | |
|---|---|
| *G06F 9/48* | (2006.01) |
| *G06F 9/50* | (2006.01) |
| *G06F 9/54* | (2006.01) |
| *H04B 10/27* | (2013.01) |
| *H04B 10/275* | (2013.01) |

(52) U.S. Cl.
CPC .............. *G06F 9/4881* (2013.01); *G06F 9/48* (2013.01); *G06F 9/4806* (2013.01); *G06F 9/4843* (2013.01); *G06F 9/4856* (2013.01); *G06F 9/50* (2013.01); *G06F 9/5005* (2013.01); *G06F 9/54* (2013.01); *G06F 9/546* (2013.01); *H04B 10/27* (2013.01); *H04B 10/275* (2013.01); *H04B 10/2755* (2013.01)

(58) Field of Classification Search
CPC .. H04B 10/27; H04B 10/275; H04B 10/2755; G06F 9/48; G06F 9/4806; G06F 9/4843; G06F 9/4881; G06F 9/50; G06F 9/5005; G06F 9/4856; G06F 9/54; G06F 9/546
See application file for complete search history.

(56) References Cited

U.S. PATENT DOCUMENTS

| | | | |
|---|---|---|---|
| 8,885,521 B2 * | 11/2014 | Wang | H04L 12/437 370/258 |
| 10,657,061 B1 * | 5/2020 | Marriner | G06F 9/5077 |

(Continued)

*Primary Examiner* — Charles M Swift
(74) *Attorney, Agent, or Firm* — Klarquist Sparkman, LLP

(57) ABSTRACT

Techniques and solutions are described for providing high-availability computing resources to service client requests. Groups of computing nodes are organized into loops, a given loop being configured to execute a particular subset of tasks, such as tasks with a hash value in a particular ranged serviced by a loop. Computing nodes within a loop can evaluate a task request to determine whether the task request conflicts with another task currently assigned to a node. If a computing node which sent out a task request determines that no conflict was identified, it can execute the task request. Communications within a loop can occur unidirectionally, such that a node which initiated a communication will receive the communication from the last loop node. Loops can be connected to form a ribbon, the ribbon providing a namespace for task execution, where hash ranges for the namespace are uniquely assigned to loops of the ribbon.

20 Claims, 10 Drawing Sheets

(56) References Cited

U.S. PATENT DOCUMENTS

| | | | | |
|---|---|---|---|---|
| 2002/0018481 A1* | 2/2002 | Mor | .................. | H04L 47/70 |
| | | | | 370/403 |
| 2009/0089602 A1* | 4/2009 | Bose | .................. | G06F 9/3836 |
| | | | | 713/340 |
| 2010/0312874 A1* | 12/2010 | Jansen | ............... | G06F 11/3006 |
| | | | | 709/224 |
| 2013/0263151 A1* | 10/2013 | Li | .................. | G06F 9/5083 |
| | | | | 718/105 |
| 2015/0032794 A1* | 1/2015 | Mittal | ............... | H04L 47/215 |
| | | | | 709/202 |
| 2015/0117267 A1* | 4/2015 | Lih | .................. | H04L 12/437 |
| | | | | 370/258 |
| 2015/0143364 A1* | 5/2015 | Anderson | ............ | G06F 9/45558 |
| | | | | 718/1 |

\* cited by examiner

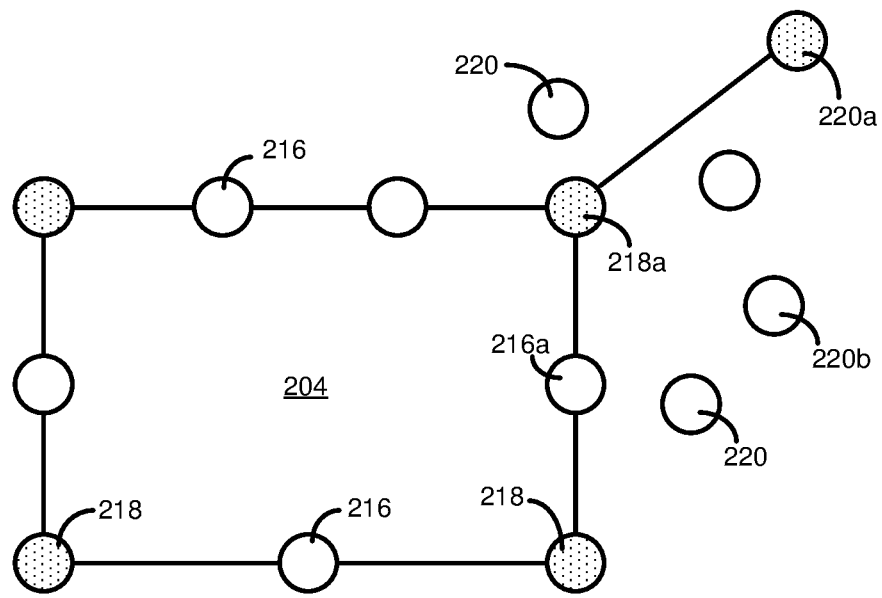
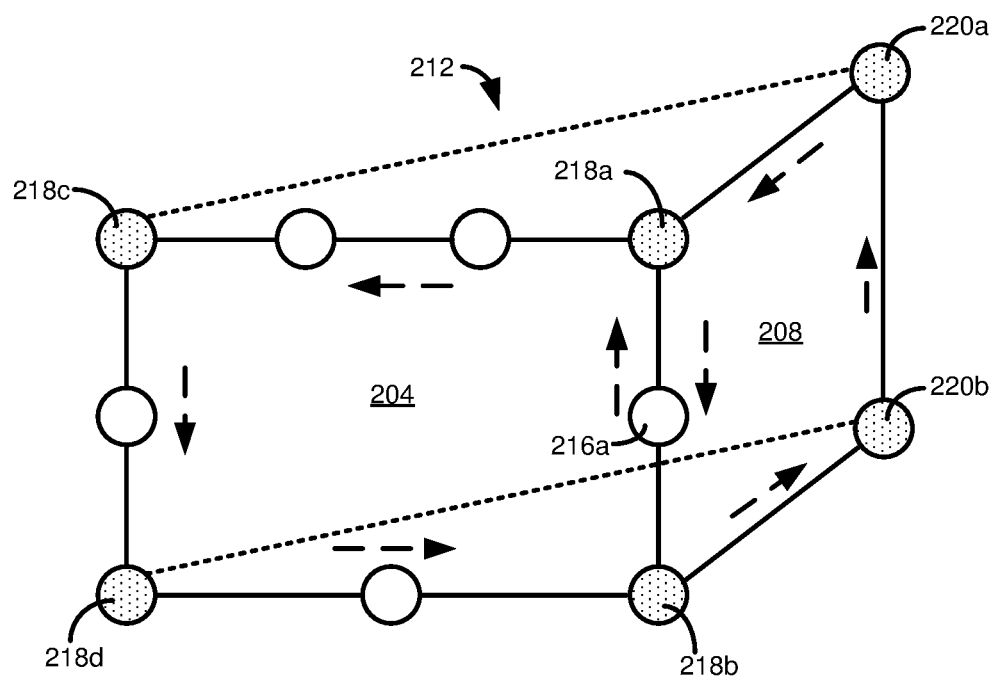
FIG. 2

| Node ID | L1 Left | L1 Right | Loop1 ID | Direction L1 | L2 Left | L2 Right | Loop2 ID | Direction L2 | Top | Bottom |
|---|---|---|---|---|---|---|---|---|---|---|
| 1 | 6 | 2 | a | R | 9 | 6 | c | R | 9 | 2 |
| 2 | 1 | 3 | a | R | | | | | | |
| 3 | 2 | 4 | a | R | 4 | A | b | L | | A |
| 4 | 3 | 5 | a | R | 5 | 3 | b | L | | |
| 5 | 4 | 6 | a | R | E | 4 | b | L | | |
| 6 | 5 | 1 | a | R | 1 | 10 | | | | |
| A | 3 | B | b | L | | | | | 3 | |
| B | A | C | b | L | C | 7 | c | R | | 7 |
| C | B | D | b | L | B | D | c | R | | |
| D | C | E | b | L | A | C | c | R | | |
| E | D | 5 | b | L | | | | | | |
| 7 | B | 8 | c | R | | | | | B | |
| 8 | 7 | 9 | c | R | | | | | | |
| 9 | 8 | 1 | c | R | | | | | | |
| 10 | 6 | 11 | c | R | | | | | | |
| 11 | 10 | 12 | c | R | | | | | | |
| 12 | 11 | D | c | R | | | | | | |

HIGH AVAILABILITY CLUSTER MANAGEMENT OF COMPUTING NODES

CROSS REFERENCE TO RELATED APPLICATIONS

This application claims the benefit of U.S. Provisional Patent Application No. 62/785,448, filed on Dec. 27, 2018, which is hereby incorporated herein by reference.

FIELD

The present disclosure generally relates to managing collections of computing resources. Particular embodiments relate to managing interconnected groups of computing nodes.

BACKGROUND

Cloud computing scenarios are becoming increasingly common for a variety of reasons. A cloud includes multiple networked computers. Jobs to be processed in a cloud environment can be delegated to individual nodes, or aspects of the job can be performed by multiple nodes, including parallelizing aspects of a job for concurrent execution by multiple nodes. However, managing node clusters and job distribution can be complex. In cases where a centralized manager node is present, communications to the node can be a system bottleneck and, in any event, can reduce cluster performance due to interactions between an executor node and a manager node. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for providing high-availability computing resources to service client requests. Groups of computing nodes are organized into loops, a given loop being configured to execute a particular subset of tasks, such as tasks with a hash value in a particular range serviced by a loop. Computing nodes within a loop can evaluate a task request to determine whether the task request conflicts with another task currently assigned to a node. If a computing node which sent out a task request determines that no conflict was identified, it can execute the task request. Communications within a loop can occur unidirectionally, such that a node which initiated a communication will receive the communication from the last loop node. Loops can be connected to form a ribbon, the ribbon providing a namespace for task execution, where hash ranges for the namespace are uniquely assigned to loops of the ribbon.

In one aspect, a method is provided for executing tasks from a client device by a first computing node. The first computing node is connected to a plurality of computing nodes in a loop. Computing nodes of the loop, including the first computing node, include one or more processors and at least one memory coupled to the one or more processors. The computing nodes of the loop are configured to operate at least one service configured to process tasks from one or more clients. A given computing node of the loop is connected to a left neighbor computing node and a right neighbor computing node. Computing nodes of the loop pass communications unidirectionally about the loop.

A first task request is received from a first client device. It is determined that the first task request does not conflict with a task assigned to the first computing node. The first task request is sent to a first neighbor computing node of the first computing node, in the direction of loop communication message passing. The first task request is received from a second neighbor computing node of the first computing node, in the direction of loop communication message passing. The first task request is executed.

In another aspect, a method is provided of executing tasks from a client device by a first computing node. A ribbon is formed having multiple loops and at least one unidirectional communication pathway. A given loop of the multiple loops includes a plurality of computing nodes having a unidirectional communication pathway between nodes of the given loop. The unidirectional loop communication pathway is reversed between adjacent loops. A namespace is divided into ranges using consistent hashing, and a unique range of the ranges is assigned to given loops of the multiple loops.

Additional operations are performed with a receiving computing node of a loop of the multiple loops. A task request is received by the receiving computing node. It is determined that the task request does not conflict with a task assigned to the receiving computing node. The task request is sent to a first neighbor computing node in the direction of message passing for a loop of which the receiving computing node is a member. The task request is received by the receiving computing node from a second neighbor computing node in the direction of message passing. In response to receiving the task request from the second neighbor computing node, the receiving node executes the task request.

In a further embodiment, a computing system is provided that implements a high-availability task execution cluster. The cluster includes a first plurality of computing nodes. A given computing node includes at least one processor, one or more memories coupled to the at least one processor, and computer-executable instructions, stored in the one or more memories, and executable on the at least one processor, for implementing at least one task execution service.

The computing system implements a first plurality of loops. A given loop is formed from a second plurality of the first plurality of computing nodes. Computing nodes within a given loop are connected to a pair of other computing nodes in the given loop and pass messages unidirectionally within the loop. The computing system also implements at least a first ribbon from the first plurality of loops. A given loop of the first plurality of loops includes a first connect node that is in communication with a second connect node of an adjacent loop in a unidirectional ribbon message passing direction.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 2 is a schematic diagram illustrating how a plurality of loops can be connected to form a ribbon.

FIG. 7 is an example hash table that can be used with a collection of loops using a consistent hash, or similar, technique.

DETAILED DESCRIPTION

Example 1

Overview

Figure 1:
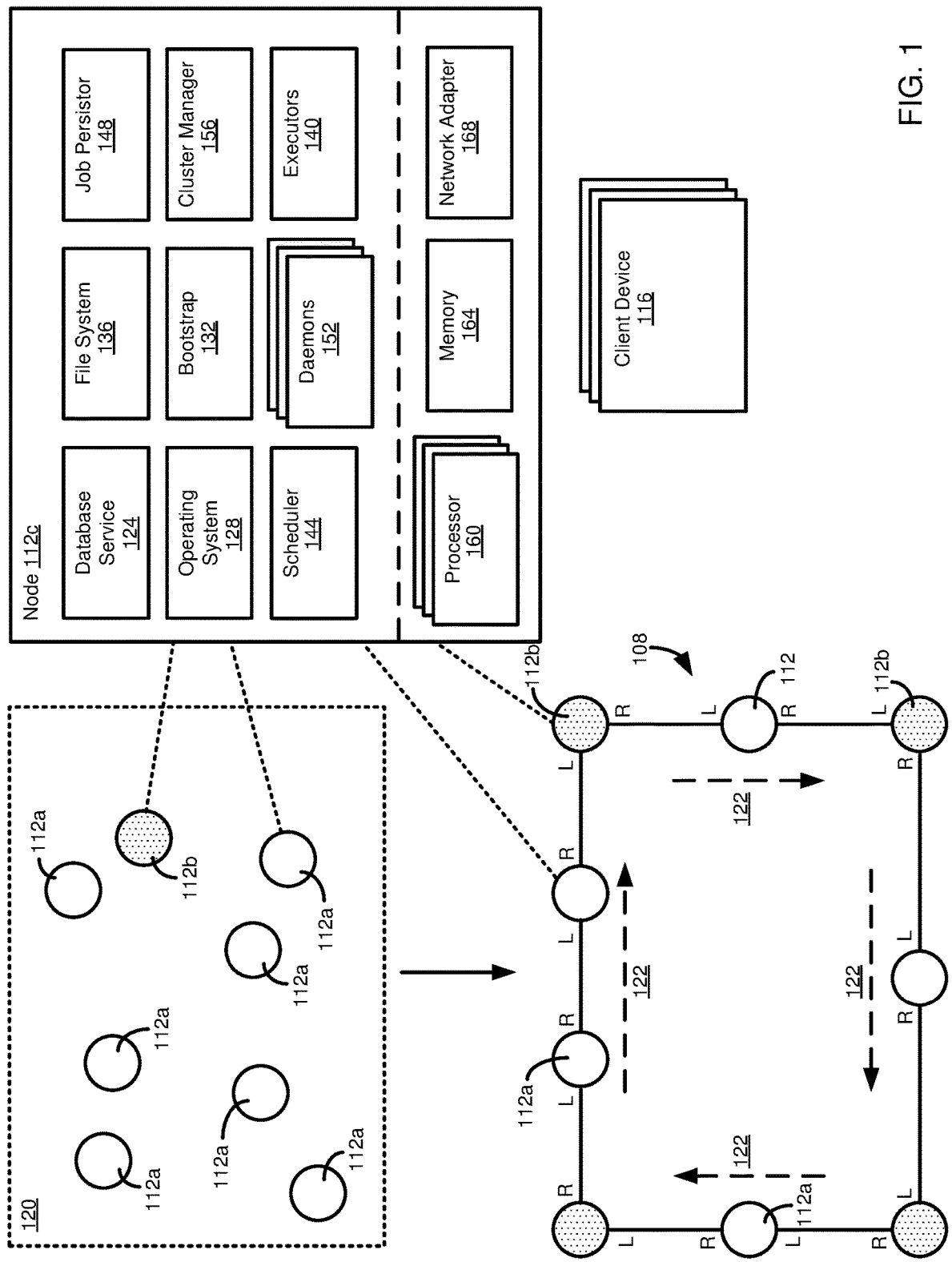
FIG. 1 is a schematic diagram illustrating how a portion of a cluster of nodes can be formed into a loop, and components of a node.

Cloud computing scenarios are becoming increasingly common for a variety of reasons. A cloud includes multiple networked computers. Jobs to be processed in a cloud environment can be delegated to individual nodes, or aspects of the job can be performed by multiple nodes, including parallelizing aspects of a job for concurrent execution by multiple nodes. However, managing node clusters and job distribution can be complex. In cases where a centralized manager node is present, communications to the node can be a system bottleneck and, in any event, can reduce cluster performance due to interactions between an executor node and a manager node. Accordingly, room for improvement exists.

Typical cluster management solutions either employ multi-part consensus algorithms, which can be difficult to implement, or do not scale to the increasingly large numbers of nodes that are being used in cloud computing clusters. In addition, as discussed above, typical clusters are arranged in either a cooperative orchestration framework or a supervisor orchestration framework. Cooperative orchestration frameworks can be more resilient, since there is not a single point of failure in the form of a supervisor node, but can incur high communication costs in communicating node and job state information across the cluster. Supervisory orchestration frameworks can incur lower communication costs (e.g., communications between fewer nodes may be required), but communications with the supervisor node can become a bottleneck, and the supervisor node can serve as a single point of failure, making the cluster less resilient.

The present disclosure provides a cluster management protocol that is both supervisory and cooperative. The protocol is scalable to larger cluster sizes, and has a straightforward implementation. The protocol organizes nodes into units referred to as loops. When a task is received that is executable by the loop, a receiving node can directionally inform a node of a pair of connected loop nodes. Each receiving node determines whether the task would conflict with a task being performed by the node. A conflict can be indicated by the task having a same definition as a task being performed by a loop node. In other cases, a conflict can be indicated in other ways, such as an amount of a resource (e.g., number of execution threads, number of running processes for a service) being used, or a lock being placed on a particular resource needed for a task (e.g., a database table).

If no conflict is determined, the task definition and execution request is passed, directionally, to next nodes in the loop. If a receiving node identifies a conflict with a currently executing task, the receiving node can set a flag or bit indicating a conflict (or change a status associated with the task, such as "pending" to "rejected"), or otherwise indicate a conflict. Or, the receiving node can not forward the task request to a next node, and the node initially receiving the request can assume that a request has a conflict after a timeout period has passed. If the task request is received by the originally receiving node, the originating node can determine whether another node of the task has a conflict with the task (e.g., by checking a state of the task). If no conflicts are identified, the originating node can set the state of the task to "running," or a similar designation, and begin processing the task.

Multiple loops can be interconnected to form a ribbon. Among other things, loops within a ribbon can exchange information, and optionally tasks. For example, tasks can be defined with respect to a namespace, such as a hash value formed from task parameters or metadata. Loops can form hash buckets so that each loop is assigned a range of possible hash values. Loops can exchange information among themselves to establish the range of hash values that will be executable by a particular loop. Loops can also exchange tasks among themselves, in at least some cases, such as if a loop containing no nodes available to perform a task forwards the task to a connected loop, or if the task is out of range of a current loop. In turn, ribbons can be connected to form a structure referred to as a prism. A prism can be a loosely coupled set of ribbons, where the ribbons can belong to different cloud systems (e.g. where a client may have data stored in, or processing capacity available at, cloud platforms provided by two different vendors, and it may be beneficial to pass jobs, or job information, between a ribbon associated with a first cloud system and a ribbon associated with a second cloud system, where the first and second, and optionally additional, cloud systems can access a central/common data store—having ribbons coupled in a prism structure can allow jobs to be distributed between cloud platforms, as well as being distributed between loops/nodes in a single platform) or deployments, or to different verticals (e.g., collections of nodes sharing only high level aspects of a namespace or other properties, such as tenant or user, which can be useful in maintaining a consolidated, but distributed, workflow, yet maintaining other separations, such as for legal purposes, between other data/processing).

The disclosed arrangement of nodes into loops and ribbons can provide a variety of advantages. The size of a loop can be scaled up or down as needed to account for the number of jobs being performed on a particular loop, making the use of nodes more optimal. The loops can also be self-healing, as failed or non-communicating nodes can be removed from a loop, and optionally replaced with other nodes. Similarly, for a ribbon, a non-communicating loop can be bypassed, and optionally a namespace redistributed among reachable loops. Complementing this functionality, nodes can dynamically adjust whether they are connected nodes (which can also be referred to as gateway nodes), which are connected to internal loop nodes and to connected nodes of other loops, or whether they are internal nodes (which can also be referred to as normal nodes), which only communicate with nodes in the current loop. The ability to change node type can assist in adding new loops to a ribbon, bypassing unavailable loops, or creating new loops or modify loop structures.

As nodes and loops can dynamically adapt, loops and ribbons are cooperative and decentralized, eliminating bottlenecks or single points of failure. The cooperative nature of the nodes and structures created using multiple nodes also helps maximize system performance, as all nodes are available to do work, as opposed to a node only taking on a supervisory role. However, the ability of one loop in a ribbon to pass namespace information to another loop of a ribbon provides a supervisory aspect, as an upstream node constrains the namespace available for a downstream node, and obviates extensive intercommunication between all nodes in a ribbon for coordinating work assignments.

Thus, the disclosed technologies can improve computing efficiency in computing clusters, and reduce resource use, such as reducing network communications. Disclosed technologies can also facilitate task distribution without requiring resources to be locked, while still avoiding deadlock situations.

Example 2

Example Node Loop

FIG. 1 illustrates how a basic structural unit of a loop 108 can be formed from a plurality of nodes (e.g., computing nodes) 112. The nodes 112 can be configured to perform various computing tasks, and can include different services. For each service, a number of different tasks can be performed, where task types can be similar or different between services, for accomplishing particular actions for the service. For example, the nodes 112 can perform tasks associated with actions such as "provision" (e.g. provide a requested resource), start a service, stop a service, configure a service, backup a service, upgrade a service, or recover a service. The nodes 112, in a particular implementation, can provide database services for one or more databases, such as a relational database system or a document store database system. The nodes 112 can be configured to request (or receive) particular tasks, such as from client computing systems or devices 116. A scheduler can control which types of tasks a node 112 can request or receive, such as at a given time, which can be based on resource availability at a node, or with respect to a particular service provided by the node.

Jobs or tasks can have particular states, such as not-started, running, blocked, or being ready (pending) for a particular processing stage. Different processing stages can use different resources of a node 112, and so a node may be able to take jobs at a second stage even if the node cannot accept any more jobs at a first stage. Jobs to be requested, or available to be received, by a particular node can be filtered using criteria such as job type, service (e.g., using an identifier of a specific service), tenant id (e.g., in a multi-tenant database or cloud environment), daemon type, or a combination of these criteria. The criteria can be fixed for a particular node 112, or can be adjusted dynamically, including based on resource availability at a node, resource availability in a loop 108, or resource availability in a cluster containing the loop 108. Or configuration or priority settings may be provided for the node (including for the node as a member of the loop) that determine which tasks the node can perform.

FIG. 1 illustrates a collection 120 of unorganized nodes 112a, 112b, which can represent the state at cluster startup, where no loops 108 have yet been formed. A node, node 112b, can check a persisted loop or cluster definition to determine that it is not connected to any other nodes. In some cases, the node 112b can persist a more comprehensive view of a cluster (e.g., one or more loops, a ribbon, or a collection of loops and ribbons, such as a prism). In any event, if the node 112b determines that it is not part of a loop, or that no loops exist, the node 112b can begin a loop formation process.

Nodes 112 can have at least two types. A "normal," or "unconnected" node, such as the nodes 112a, can be a node that is an "internal" loop node, in that it communicates only with other nodes in its loop. More particularly, and as will be further explained, a normal node 112a typically only communicates with two other, neighbor loop nodes—sending communications to a node on a first "side" and receiving communications from a node on a second "side." A "connected" node, which can also be referred to as a gateway or edge node, can be a node 112 that is connected to nodes 112 in a particular loop, but is also connected to a connected node of another loop. When a normal node 112a determines that no loops have been formed, the normal node can convert to a connected node 112b, as shown in FIG. 1. The connected node 112b can then initiate a loop instantiation process to produce the loop 108.

In some cases, the node 112b can recruit other nodes 112, such as nodes 112a, to a loop. That is, a node 112 can maintain identifiers for nodes within a cluster, or can be provided with, or retrieve, such identifiers at startup. In a particular implementation, node identifiers (and, optionally, identifiers for one or more of loops, ribbons or prisms) may be GUIDs (globally unique identifiers). In yet a further implementation, messages passed between nodes can also be in the form of GUIDs (which can be produced by hashing namespace tokens, as described herein). In addition to, or in place of, maintaining or accessing a list of nodes within a cluster, the nodes 112 can be provided with a node discovery process or protocol. In other cases, nodes 112, such as nodes 112a of the collection 120 that are not yet part of a loop, can search for a loop to join, and can connect to a node 112a, 112b that is part of a loop.

The nodes 112 can include a setting for a default loop size or configuration, and optionally can include rules for when and how to deviate from such default size or configuration. These settings can be used to determine, for example, whether a node 112 will join an existing loop or form a new loop, what loop node the joining node will connect to, and whether the joining node will connect to a normal node 112a or a connected node 112b. The settings can also determine whether the joining node, when part of the loop, will act as a normal node 112a or a connected node 112b. In the case of a connected node 112b, the settings can also determine how the connected node 112b will connect to a connected node of another loop.

The loop formation process can produce the loop 108, which includes five normal nodes 112a and four connected nodes 112b. As the loop 108 is not connected to any other loops yet, the nodes 112b can be nodes that are available to be connected to another loop. In other scenarios, fewer, or none, of the nodes 112 in the loop 108 are connected nodes 112b. For example, if a normal node 112a receives a request from a node of another loop to join in a ribbon (e.g., series of connected loops), the normal node can convert to a connected node 112b.

A feature of the loop 108 is that normal nodes 112a are typically connected to two other loop nodes, while connected nodes 112b are typically connected to two loop nodes and to a connected node of a different loop. For nodes 112 within the loop (including for nodes 112b, considered as part of the loop) 108, a given node typically sends communications to one (and, at least in certain embodiments, only one) neighbor node, and receives communications from one (and, at least in certain embodiments, only one) neighbor node. The communications can thus provide a directionality, or "handedness," to a loop 108. For example, the loop 108 is shown as having nodes 112a, 112b where each node has a "left" side and a "right" side, with the right side of one node being connected to the left side of an adjacent node. Communications occur from left to right, as indicated by dashed arrows 122, providing a clockwise communication path. That is, a given node of the loop 108 will receive communications from the node on its left, and will send communications to the node on its right. Having a defined communication direction can be beneficial, as it allows a given node 112a, 112b of the loop 108 to send a communication and, if the communication is received from the left-connected node, the given node can assume that the communication has passed through all other nodes of the loop 108.

The number of nodes to be included in the loop 108 can be dynamic, and can be selected based on various criteria. For example, to provide high availability, it may be useful to have at least three nodes in a loop. In the event a ribbon structure is used, it may be useful to have at least four nodes in a loop, where the four nodes would also be connect nodes, so that the loop 108 can communicate with adjacent loops in the ribbon. That is, having a single connect node-connect node communication channel between adjacent loops can serve as a single point of failure, and thus it can be beneficial to include two connect node-connect node communications channels between each pair of adjacent loops. However, in a particular implementation, a loop may include three or more nodes, but a single connect node-connect node communication channel is used for at least one pair of adjacent loops.

In at least some cases, it can be beneficial to include at least three loops in a ribbon to achieve benefits of a ribbon. As the ribbon is closed, each loop communicates with two adjacent (e.g., "right" and "left") loops. If two connect nodes per loop are used for each connection to another loop, four loops nodes (in this case, all connect nodes) are advisable, in at least some implementations. In addition, having two connected nodes couple a pair of adjacent loops can be useful in determining whether a loop is unreachable (e.g., neither connect node of a first loop can reach a second loop), or whether one of the connect nodes (of either the first or second loop) is unreachable. Thus, having two connect node-connect node pathways between adjacent loops can be useful in conducting "healing" (e.g., rearrangement actions) in a loop or ribbon, such as determining if an entire loop is unreachable or if only loop level rearrangements (such as upgrading a normal node to be a new connect node) are needed.

On the other hand, larger numbers of nodes in a loop can potentially increase the chances for collisions or conflicts between tasks (at least, if the larger loop corresponds to a larger hash value range for the loop) and, in any event, can delay task execution or loop/ribbon processes, as messages will have to pass through a larger number of nodes. Accordingly, an upper bound can be set for the number of nodes in a loop, as well as a lower bound. In some cases, an upper bound can be between 6 and 8 nodes. However, in other cases, the upper bound can be significantly larger than 8 nodes.

FIG. 1 also presents an example node structure, in the form of node 112c, which can be a normal node 112a or a connected node 112b. A node 112c can include one or more services, such as a database service 124, as shown. The database service 124 can be a service for a relational database, a document database, or another type of database. In some cases, a node 112c can include multiple database services 124, such as including a service for a relational database and a service for a document database. As will be further described, services provided by a node 112c, including the database service 124, can be associated with an identifier. The identifier can be used along with other information to produce a hash value that can be used to describe tasks that are requested of the node 112c.

The node 112c can include an operating system 128, and a bootstrap file or process 132 that can be used to set node parameters on node startup. The bootstrap 132 can include instructions that can be used to generate a loop, and can include a list of available nodes from which a loop might be constructed. The bootstrap 132, and other data for use by the node 112c, can be stored in a file system 136. The operating system 128 can mediate access to the file system 136.

Tasks performed by the node 112c can be carried out by executors 140 (e.g., threads). Tasks can be assigned to the executors 140 by a scheduler 144. The status of a task can be stored (such as in the file system 136) by a job persistor 148. Task can also be assigned to one or more daemons 152, which can be background processes running on the node 112c.

The node 112c can include a cluster manager 156. The cluster manager 156 can perform operations related to aspects of a cluster, such as switching the node 112c between connect and normal node status, building loops, adjusting loops (e.g., adding nodes, removing nodes, or alerting a hash value range associated with a loop), bypassing unreachable nodes and loops, and associating and disassociating ribbons (collections of loops) within a prism structure.

The node 112c can include hardware components that can store and process instructions for carrying out functions of the node described above. For example, the node 112c can include one or more processors 160. The node 112c can include memory 164, which can include memory for storing program instructions and processing data, such as secondary storage (e.g., non-volatile storage), as well as memory used while executing instructions (e.g., volatile storage, such as RAM). The node 112c can include a network adapter 168, which can mediate communications with other nodes of the loop 108, other cluster structures (e.g., nodes of other loops), or with a client device 116.

Example 3

Example Formation of Node Ribbon

FIG. 2 illustrates how a loop 204 (which can be analogous to the loop 108 of FIG. 1) can be expanded to provide an additional loop 208, which in turn can form a ribbon 212. The loop 204 includes a plurality of nodes, in the form of normal nodes 216 and connected nodes 218. Assume that a cluster is expanded, either because the cluster is in a startup or general expansion mode, or because a loop needs to expand based on a current processing load, and configuration settings indicate that another node cannot be added as part of the loop 204 itself. A cluster can include one or more expansion nodes 220, where an expansion node 220 can be a node that is not currently assigned to a loop, or can be a node that is assigned to a different loop, and the ribbon (or cluster) is being rearranged to balance performance or resource use. In some cases, the expansion node 220 can be a node of the loop 204 that is being reclassified as part of the new loop 208.

As shown in the upper diagram, a connection can be made between a connected node 218a of the loop 204 and the first expansion node 220a. The first expansion node 220a, in some cases, and as shown, can at least initially be connected as a connected node (rather than a normal node). In other cases, the first expansion node 220a can be initially connected as a normal node. Note that the loop 204 as shown as connected to the expansion node 220a, where the expansion node is not part of the loop 204, and is not yet part of another loop.

The configuration of the cluster associated with the loop 204 can be considered to be an unstable configuration (because it has nodes that do not have two neighbors, and thus there are "open" connections), and a system may strive to reach a more stable configuration, such as by completing the new loop 208 (bottom structure of FIG. 2) by connecting to an additional expansion node 220b, which thus forms the new loop 208, along with normal node 216a and connected node 218b. In some cases, if the new loop 208 cannot otherwise be completed (or based on other considerations), a node 220b can be a node 216, 220 originally part of the loop 204, provided that the loop 204 would still comply with relevant configuration considerations (e.g., having at least four nodes when the loop 204 is part of a ribbon structure).

In the case of FIG. 2, the loops 204, 208 can form the ribbon 212 if expansion nodes 220a and 220b are connected to connected nodes 218c, 218d of the loop 204. At nodes connecting two loops, such as loops 204, 208, a connected node, such as node 218a, can serve to pass messages to an adjacent loop. Communications can occur within the ribbon 212 in a similar manner as within the loops 204, 208, with communications passing directionally about the loops, and where a communication sent through the ribbon can be recognized as completed by an originating loop when a communication it initiated is received by the originating loop. Although shown as including two loops 204, 208, the process of FIG. 2 can be repeated to form ribbons having a larger number of loops. In at least some aspects, a ribbon includes at least three loops.

In addition, an analogous process can be used to connect the ribbon 212 to one or more additional ribbons (such as in a stack) to form a prism structure. In the case of a prism, a connect node can be connected to an additional loop (e.g., the connect node can bridge nodes within a loop, and bridge loops of two different ribbons). Thus, connect nodes can track which nodes they receive communication from (a top node) and which nodes they send communications to (a bottom node), in a similar manner as nodes within a loop can be considered to have left and right neighbors. Thus, messages can have a counter flow relationship between ribbons in a similar manner as a node can have a counter flow relationship when it is a member of two loops (e.g., exchanging messages in a first direction for a first loop and in a second, opposite or counter flow direction, for a second loop).

Example 4

Example Node Ribbon

Figure 3:
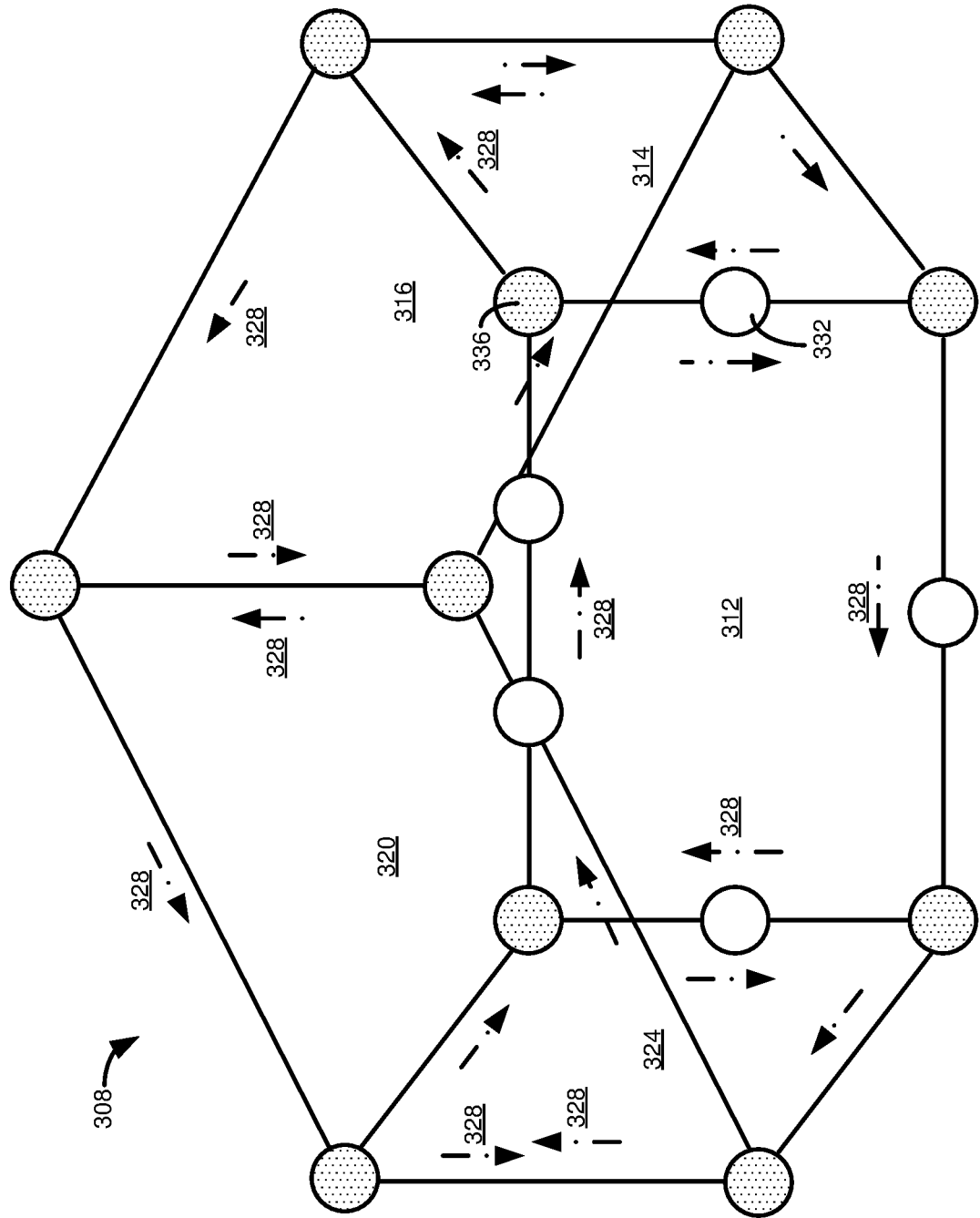
FIG. 3 is a schematic diagram illustrating a ribbon, including how messages can pass in different directions in adjacent loops in a ribbon, and how messages can be passed between adjacent loops.

FIG. 3 illustrates an example ribbon 308 formed from loops 312, 314, 316, 320, 324. Arrows 328 indicate communication directions within the loops 312, 314, 316, 320, 324. It can be seen that the message direction alternates between loops, such that a node, such as node 332, has messages pass in one direction (e.g., clockwise, loop 312) in a first loop of which it is a member, and another, opposite direction (e.g., counter clockwise, loop 314) in a second loop of which it is a member. In at least some cases, a node that is shared between two loops, such as a normal node (e.g., 332) or a connect node (e.g., node 336) can process tasks for either loop of which it is a member. Tasks can be associated with particular loops based on the direction of message passing, a loop identifier associated with the task, a hash value of the task, or a combination of these features. If desired, the available processing or other resource capacity of a shared node for a particular loop can be specified, such as having the resources shared equally between two loops, not shared at all (e.g., one loop uses all resource capacity, and the other loop only uses the node for message passing), or configurations in between these scenarios (e.g., 25%/75%).

It can be seen that since the ribbon 308 includes a closed (e.g., circular or "looped") communication path between loops 312, 314, 316, 320, 324, a communication that starts on one of the loops will pass through the other loops in sequence, eventually reaching the originating loop. This is in a similar manner as described for communications within a loop 312, 314, 316, 320, 324, where communications been an originating node and its loop members will eventually reach the originating node again, which can provide a feedback mechanism as to when a communications process is complete. As explained above, ribbons can be connected to other ribbons, in which case a node that connects two ribbons can have messages for a first ribbon pass in one direction and message for another ribbon pass in a second direction.

Example 5

Example Loop Rerouting to Bypass Unreachable Node

Figure 4:
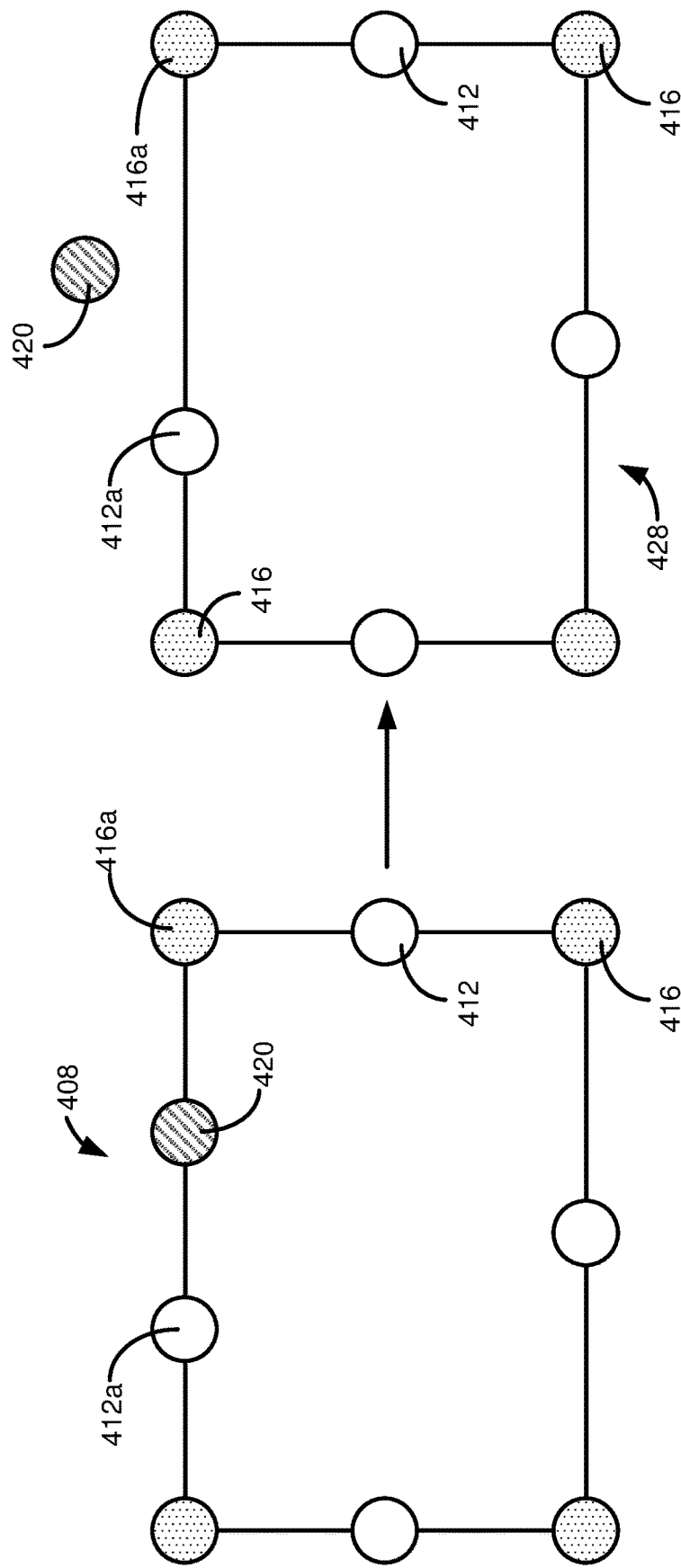
FIG. 4 is a schematic diagram illustrating how a loop can expel a non-communicating node.

An advantage of the disclosed technologies is the ability of node collections, such as loops or ribbons, to "self heal." That is, node structures can rearrange if is determined that a node is unreachable, or should otherwise be permanently or temporarily excluded from a loop. FIG. 4 illustrates a loop 408, having normal nodes 412, connected nodes 416, and a failed or otherwise unreachable node 420. If it is determined that the node 420 is unreachable, a process can be initiated to remove the node 420 from the loop. For example, a connection can be established directly between the two nodes, 412a, 416a, to which the unreachable node 420 was originally connected. The connections of nodes 412a, 416a to node 420 can be terminated, thus producing the loop 428.

The rearrangement of loop 408 to loop 428 can be accomplished in a variety of manners. For example, node 412a can initiate a rearrangement process if it determined that node 420 is unreachable. An unreachable node 420 may be indicated by an acknowledgement from node 420 being expected by node 412a, but not received. Or, an originating node (or a node otherwise checking the health or status of the loop 408) can determine that an error condition exists if a communication sent by the originating node is not again received by the originating node after traversing the loop 408 within a set amount of time. If an unreachable node is detected, the originating node can initiate a procedure to determine which node has failed (e.g., by polling a list of nodes in the loop 408), and to direct nodes 412a and 416a to connect when it is determined that node 420 is unreachable.

Although this Example 5 describes removing a node that is unreachable, a similar process can be carried out in other circumstances. For example, a similar rearrangement can occur if it is determined (such as by one of the nodes in the loop 408) that the loop has excess capacity, or that the loop should otherwise have a smaller number of nodes.

Example 6

Example Loop Expansion

Figure 5:
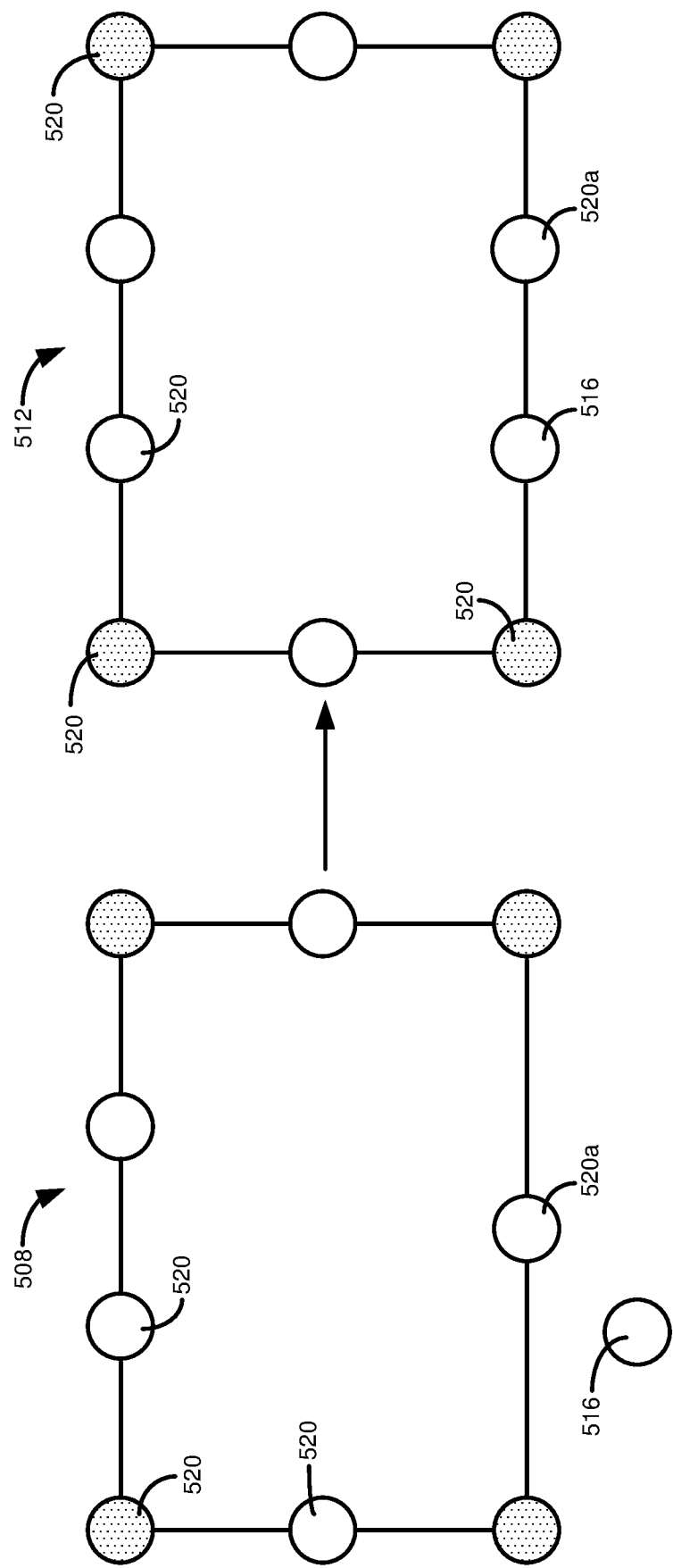
FIG. 5 is a schematic diagram illustrating how a loop can expand to add an additional node.

FIG. 5 illustrates a scenario for expanding or contracting between a loop 508 and a loop 512. When it is determined that the loop 508 should be expanded, a node 516 can be incorporated into the loop 508. For example, a node 520a of the loop 508 may determine that performance conditions, such as a number of tasks in process or pending, exceeds a set capacity, and indicates that the loop 508 should be expanded. The node 520a can determine how the node 516 should be added to the loop, and can direct other loops nodes 520 to rearrange node connections appropriately. In a specific example, the node 520a can forward the node 516 an identifier of the node 520 to which node 520a sends communications, which can be set by the node 516 as its "to" node. The node 516 can set node 520a as its "from" node. In turn, the node 520a can update its "to" node to be node 516. This process produces the loop 512. The loop 512 can be converted back to the loop 508 by reversing the procedure for adding a node.

Example 7

Example Ribbon Definition and Task Distribution Criteria

Organizing nodes into loops and ribbons can facilitate concurrent task execution, while also helping ensure that conflicts are avoided and reducing or eliminating the need for locks, or the occurrence of deadlocks. Tasks can be associated with various properties or metadata, which can be referred to as tokens. The tokens can be independent variables or properties, can define degrees of freedom for a namespace used in task distribution.

Tokens can include properties of a task such as
Tenant Identifier—a tenant from which a task originates or for which the task is being performed
Service Identifier—a particular service which will perform the task; typically, a node can support multiple services
Region—a geographic indicator of the geographical location from which the task is being requested, or to which results should be provided (e.g., North America, Europe)
Service Type—indicating the type of service request, such as database, calculation, etc.
Task Type—providing a general indication of the nature of the operations to be performed
However, more, fewer, or different token types can be used, as desired. Generally, as will be discussed above, the use of fewer tokens in the namespace can increase the chance of a new task being rejected by a loop, as duplicating a task already in process.

The tokens can be processed using a suitable hash function to provide a hash value, which is then used to determine whether the task conflicts with another task. The hash value can also be used to assign the task to a particular loop in a ribbon. For example, each loop can be assigned a subset of hash values in a range of possible hash values. Typically, the tokens are concatenated and the concatenated string is hashed.

The use of standard hash tables to determine membership can be problematic if the hash table is resized. For example, a hash table that assigns tasks to loops based on hash buckets may need to be recalculated if the number of loops changes. Remapping of hash tables can be time, processor, and network intensive, and can result in delayed task execution while a cluster is being updated. Accordingly, in some cases, a form of hashing is applied that does not require remapping if the size of the hash table changes. These forms of hashing can include consistent hashing or rendezvous hashing (highest random weight, or HRW, hashing). As loops and ribbons are "circular" or closed, the use of consistent hashing or HRW hashing will distribute all possible values in the namespace among the available nodes in a loop or ribbon.

As explained in Examples 3 and 4, a node can be a member of multiple loops, such as being a member of two loops. Typically, when a node is a member of two loops, messages are passed in opposite directions for each loop. So, if a first loop of which the node is a member passes messages clockwise, the second loop of which the node is a member passes messages counter clockwise. A node can track which loop a message belongs to, and the node to which it should be passed, based on the direction from which the message was received. In addition, a message can include a loop identifier.

Figure 6:
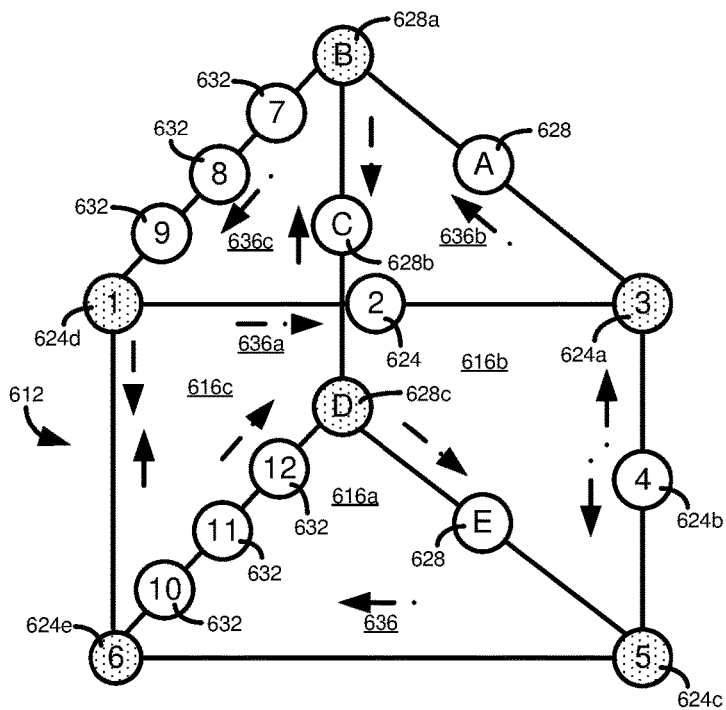
FIG. 6 is a schematic diagram of a ribbon, and a table listing properties of nodes in the ribbon.

FIG. 6 illustrates a cluster definition table 608 corresponding to the ribbon 612. In at least some aspects, a node maintains at least a portion of the table 608, such as the portion pertaining to the particular loop of which the node is a member. This information can be useful, for example, when a particular node needs to remove a node from a loop, add a node to a loop, or otherwise rearrange a loop. In further aspects, a node maintains all of the table 608. Maintaining all of the information in the table 608 can be useful, as it can allow a particular node to expand or contract a loop by adding nodes to, or removing nodes from, other loops. Maintaining all of the information in the table 608 can also be useful in that it can allow a node to reconfigure connections between loops.

The ribbon 612 includes loops 616a, 616b, 616c. Loop 616a includes nodes 624 (1-6), loop 616b includes nodes 628 (A-E) that are not shared with loop 616a, while nodes 624a, 624b, 624c are shared between loops 616a and 616b. Loop 616c includes nodes 632 (6-12) that are not shared with loops 616a or 616b. Loop 616c shares nodes 628a, 628b, 628c with loop 616c. Loop 616c shares nodes 624d, 624e with loop 616a.

As previously discussed, pairs of adjacent loops 616a, 616b, 616c typically pass messages in opposite directions, as indicated by the arrows 636. Adjacent loops 616a, 616b, 616c can communicate through connected nodes (e.g., 624a, 628a, 624d). As shown by arrows 636a, communications can pass directionally through connected nodes, such that messages can be passed directionally through the loops 616a, 616b, 616c sequentially, such that a message sent from one loop will pass through the other loops, and eventually reach the originating loop.

The table 608 defines the relationships shown in the ribbon 612. The table 608 includes a node identifier column 644, and columns 646, 648, 650, 652 that summarize node properties for the corresponding node identifier in a first loop. Columns 654, 656, 658, 660 list properties for the corresponding node in a second, optional, loop (e.g. for nodes that are connected nodes or nodes that otherwise shared between two loops). For connected nodes, columns 662, 664 summarize how communications are passed between adjacent loops.

Columns 646, 648, 654, 656 list the left and right neighbors for a given node in a particular loop. Columns 650, 658 provide an identifier for a loop in which the node is a member, and columns 652, 660 list the direction of message passing within a respective loop.

All or a portion of the table 608 can be persisted at a particular node in the ribbon 612, or can otherwise be accessed by a node. The table 608 can include additional information if desired. For example, the table 608 can include identifiers of nodes that are available in the cluster, but which may not be currently assigned to a loop. The table 608 can also include additional attributes for each node, such as a metric relating to recent resource use of the node, available memory and processing resources (e.g., an amount of RAM and a number of processing cores), available services, communication protocols supported by the node, and the like.

Nodes can share updates to the information in the table 608. For example, if a node makes a change to the table 608, the node can send the change, or the entire table, to its receiving node. A receiving node can process the change and send it in turn to its receiving node. The process can be acknowledged as complete if the changing node receives the change notice. However, the communication can occur in another way. For example, a node making a change can broadcast the change, or revised table 608, to other nodes in the loop (or in the entire ribbon). Or a master copy of table 608 can be persisted, and a node can periodically request, or be sent, an updated copy of the table 608 (including automatically being sent the updated table, or table updates, when the persisted or master copy is updated).

Example 8

Example Hash Table and Hash Range Redistribution

As explained in Example 8, a task can have values for particular tokens in a namespace. The tokens (e.g., concatenation of the tokens) can be assigned a hash value, such as by using a consistent hash algorithm or similar methodology. A loop can be assigned a particular hash range, in the event (e.g., a ribbon or prism) that multiple loops are present in a cluster. When a task is received, a receiving node can determine whether or not the hash value of the task is within the range of hash values associated with the loop (or loops) of which the node is a member. If the hash value is not within the range of a loop in which the node is a member, the node can forward the message through a loop in which it is a member, optionally being marked to be forwarded to a next loop (since the loops pass messages directionally through a ribbon). If the receiving node is a connected node and connected to a next loop, the receiving node can directly forward the message to the next loop if it is not within the range of a loop of which the receiving node is a member. If the message is received, unchanged, by the receiving node (e.g., after passing through all loops in a ribbon), an error condition can be returned in response to the task request.

FIG. 7 illustrates an example hash table 700. The hash table 700 has a loop identifier column 704, a lower hash bound column 708, and an upper hash bound column 712. The table 700, or corresponding information, can be stored by nodes of a ribbon. Hashes ranges can be assigned to loops in various ways. For example, a default arrangement can be specified, such as for use at cluster (ribbon) startup. Or, a first loop can determine a range of hash values that it can accept based on particular criteria, such as the number of nodes in the loop, the resource capacity of the loop, the expected task load, etc. The first loop can then set a range of values that will be used by the loop. That information (and optionally, the total hash range) can be sent to a next loop, which can determine a range of hash values it will accept in a similar manner as the first loop.

Each loop can forward information corresponding to a hash table 700 being developed, or otherwise forward information sufficient to indicate to a next loop an available hash range from which the next loop can set its hash range (such as a current lower value, where the next loop can set its lower bound higher than the current lower value, and up to a higher bound, which then serves as the lower bound for its next loop). The process can stop when the hash allocation processes reaches the first node, in which case, the final node can have the end of its range set to the upper limit of the hash range.

Changes to the hash ranges allocated to particular loops can be made during ribbon operation. A single criterion, or sets of criteria, can cause a loop to determine that its hash range should be expanded or reduced. These criteria can include, for example, a number of nodes in a loop, resource availability (including based on a node crash or otherwise dropping out of a loop), task load, or a similar criterion. This determination can be distributed among nodes in a loop, such as any node being able to initiate a hash range change if appropriate circumstances are detected. The loop can send its new upper boundary to the next loop. The next loop can then expand or contract its lower boundary accordingly. If the new hash range for the next loop violates criteria or constraints for the next loop, the next loop can adjust its upper boundary, and in turn notify the next loop in the communication path. Typically, the determination of a new hash range for a loop only affects new, incoming tasks—pending tasks are not terminated or rerouted if they would be performed by a different loop under an updated hash range.

Namespace adjustment can occur for reasons in addition to task and resource considerations of a loop. For example, if a loop becomes unreachable, remaining loops can alter their connections to bypass the unreachable loop, and can adjust the loop namespaces to cover the range of the unreachable loop. Or, the remaining loops can reconfigure nodes to create a new loop to take the place of the unreachable loop, with at least a portion of the remaining loops contributing nodes to the new loop.

Example 9

Example Task Request Processing

Organizing nodes into loops and ribbons can facilitate concurrent task execution, while also helping ensure that conflicts are avoided and reducing or eliminating the need for locks, or the occurrence of deadlocks. Tasks can be associated with varies properties or metadata, which can be referred to as tokens. The tokens can be independent variables or properties, can define degrees of freedom for a namespace used in task distribution.

If a node determines that a task has a hash value within the range of loop of which it is a member, the node can take an action with respect to the task. The action can be to reject the task if it conflicts with a task currently being processed (or pending) at the receiving node. If the task does not indicate a conflict, and the receiving node has resources to execute the task, the receiving node can forward the task to its neighbor in the direction of message passing for the relevant loop. If the task does not indicate a conflict, and the receiving node does not have resources to execute the task, the task can be passed to a next node in the direction of message passing as a new message, where the next node can take the above described steps as a receiving node.

If a next node receives a task request, but is not the originally receiving node (including the scenario wherein the next node is forwarded a task that makes the next node a receiving node), the next node determines whether the task creates a conflict. If the task does not create a conflict, and the next node is not also the receiving node (e.g., the message has not traversed a loop), the next node can forward the task to its next node. If the task does create a conflict, the next node can, depending on implementation, either not forward the task (in which case the task request will eventually timeout) or forward the task with an indicator that the task causes a conflict (which, for example, can cause the receiving node to return an error condition in response to the task request). If the next node is also the originally receiving node, and no conflict was identified, the next node can execute the task. When the task is executed, a task state can be set as "in process," so that conflicting tasks can be identified.

The task can be removed from a task state list when completed, or the status can otherwise be indicated as completed, so that the task will not generate a conflict with a future task request. If the next node is also the originally receiving node, and a conflict was identified, the next node can return an error in response to the task request.

In some cases, a conflict can be identified if a task request has the same hash value as a task current being executed on a node checking for a conflict. In other cases, the hash value can be used, at least primarily, for determining which loop should execute the task, and the presence of a conflict can be determined in another manner. For example, a node can evaluate task parameters (e.g., tokens, or other metadata or data related to the task) to determine whether a conflict is present. That is, for example, in some cases tasks might have different tokens, but otherwise use the same or overlapping resources, or represent tasks that should occur in a particular sequence. Checking to see if a conflict might arise can include determining that a task request being evaluated should not be performed until a current task finishes executing, or that the task being evaluated should otherwise be cancelled or delayed. A rule/constraint can be that, for the same tenant, jobs with the same job type and/or daemon type should be executed sequentially (which can be determined, for example, by a timestamp or job or sequence ID). Another specific rule/constraint can be that no two nodes should concurrently execute jobs that have the same service, job type, and daemon type.

Example 10

Example Interfaces

Interfaces can be provided to call functionality of a node, loop, or ribbon. An interface for a node can include functions or methods for:
Request job execution (e.g., send request about loop to determine if another node has a conflict)
Respond to job execution request (e.g., determine if a conflict, mark as conflict or do not forward if a conflict exists, forward to next node otherwise)
Pass message (e.g., job request) to next node in loop
Update to connect node
Downgrade to normal node
Create loop
Forward message (e.g., job execution request) to next loop (e.g., by a connect node when a hash value of a task is not within the range of a loop of which the connect node is a member)

An interface for a loop can include functions or methods for:
Create new loop
Add node to loop
Delete node from loop
Connect loop to node
Disconnect and reconnect nodes in loop
Change loop hash range In at least some cases, nodes can call interface methods for a loop. That is, nodes can jointly manage loop behavior and construction.

An interface for a ribbon can include functions or methods for:
Connect loop to ribbon
Disconnect loop from ribbon An interface for a prism can include functions or methods for:
Connect ribbon to prism
Disconnect ribbon from prism Example 11

Example Cluster Operations

Figure 8:
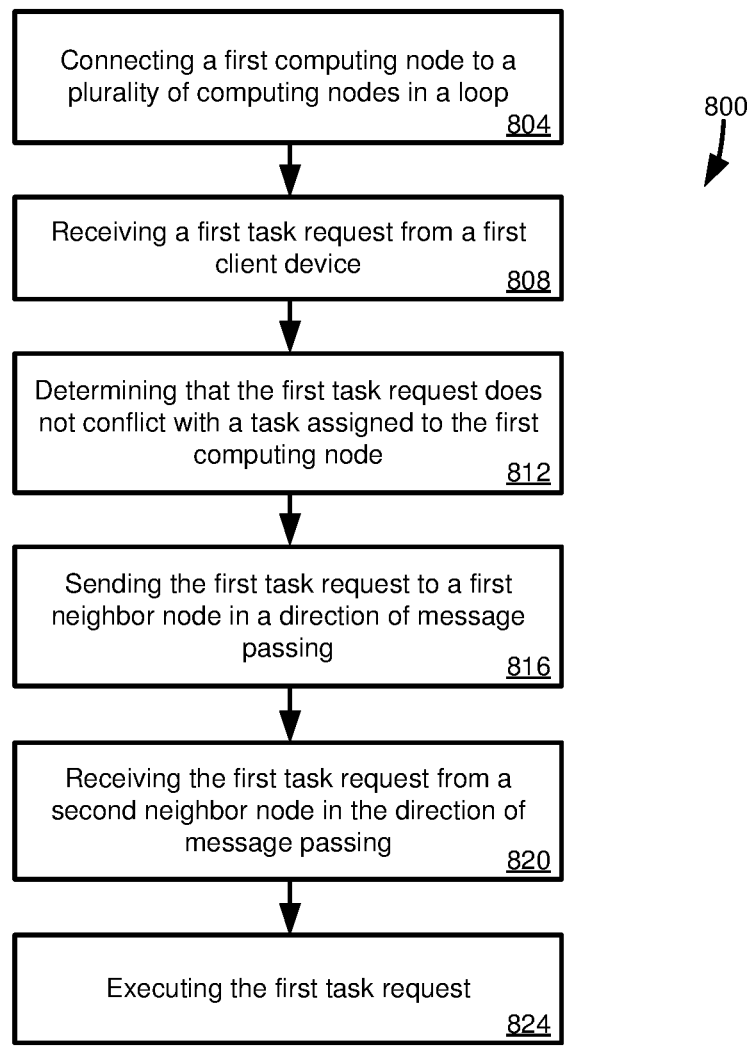
FIGS. 8 and 9 are flowcharts illustrating operations in various disclosed embodiments of operating collections of computing nodes.

FIG. 8 is a flowchart of an example method 800 of executing tasks from a client device by a first computing node. At 804, the first computing node is connected to a plurality of computing nodes in a loop. Computing nodes of the loop, including the first computing node, include one or more processors and at least one memory coupled to the one or more processors. The computing nodes of the loop are configured to operate at least one service configured to process tasks from one or more clients. A given computing node of the loop is connected to a left neighbor computing node and a right neighbor computing node. Computing nodes of the loop pass communications unidirectionally about the loop.

At 808, a first task request is received from a first client device. It is determined at 812 that the first task request does not conflict with a task assigned to the first computing node. The first task request is sent to a first neighbor computing node of the first computing node at 816, in the direction of loop communication message passing. At 820, the first task request is received from a second neighbor computing node of the first computing node, in the direction of loop communication message passing. The first task request is executed at 824.

Figure 9:
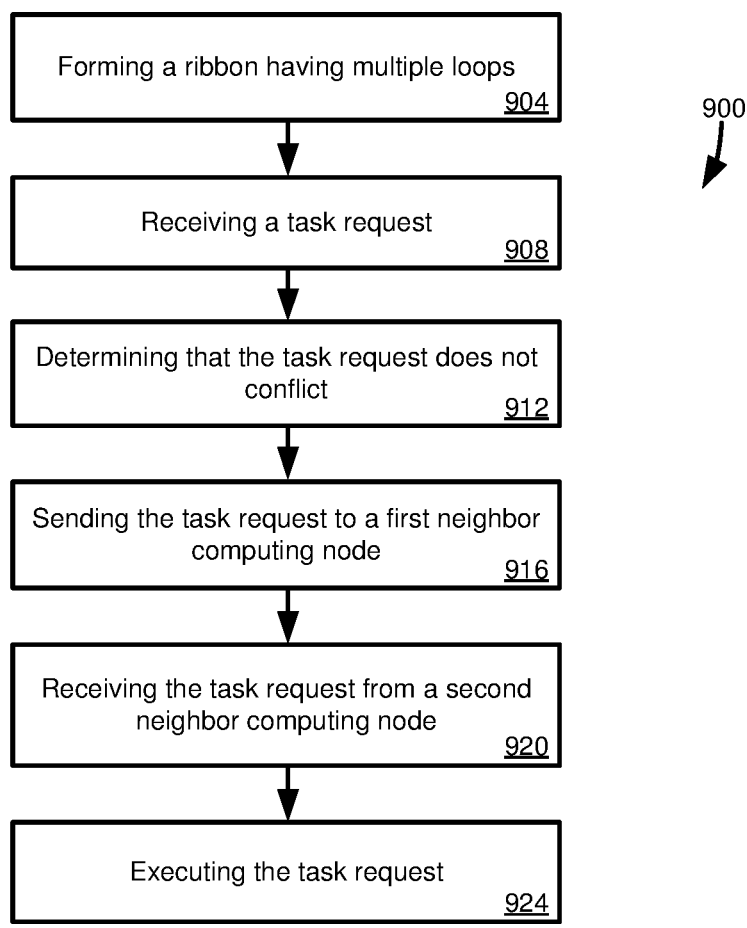

FIG. 9 is a flowchart of an example method 900 of executing tasks from a client device by a first computing node. At 904, a ribbon is formed having multiple loops and at least one unidirectional communication pathway. A given loop of the multiple loops includes a plurality of computing nodes having a unidirectional communication pathway between nodes of the given loop. The unidirectional loop communication pathway is reversed between adjacent loops.

A namespace is divided into ranges using consistent hashing, and a unique range of the ranges is assigned to given loops of the multiple loops.

Additional operations are performed with a receiving computing node of a loop of the multiple loops. A task request is received by the receiving computing node at 908. It is determined at 912 that the task request does not conflict with a task assigned to the receiving computing node. At 916, the task request is sent to a first neighbor computing node in the direction of message passing for a loop of which the receiving computing node is a member. The task request is received by the receiving computing node from a second neighbor computing node in the direction of message passing at 920. In response to receiving the task request from the second neighbor computing node, the receiving node executes the task request.

Example 12

Computing Systems

Figure 10:
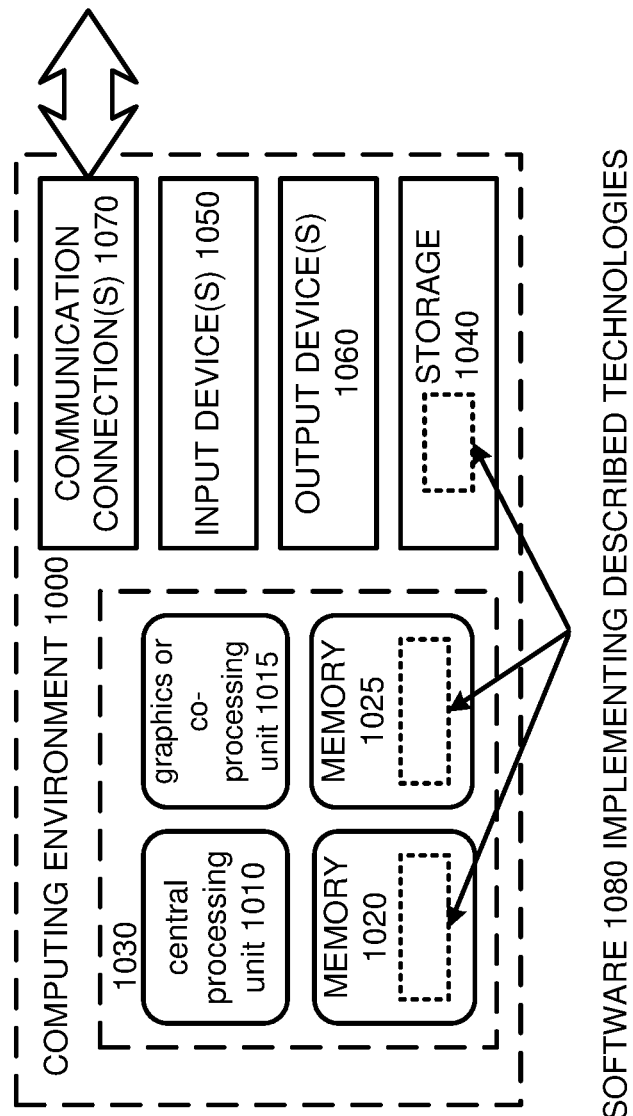
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing components of a node 112c of FIG. 1. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 13

Cloud Computing Environment

Figure 11:
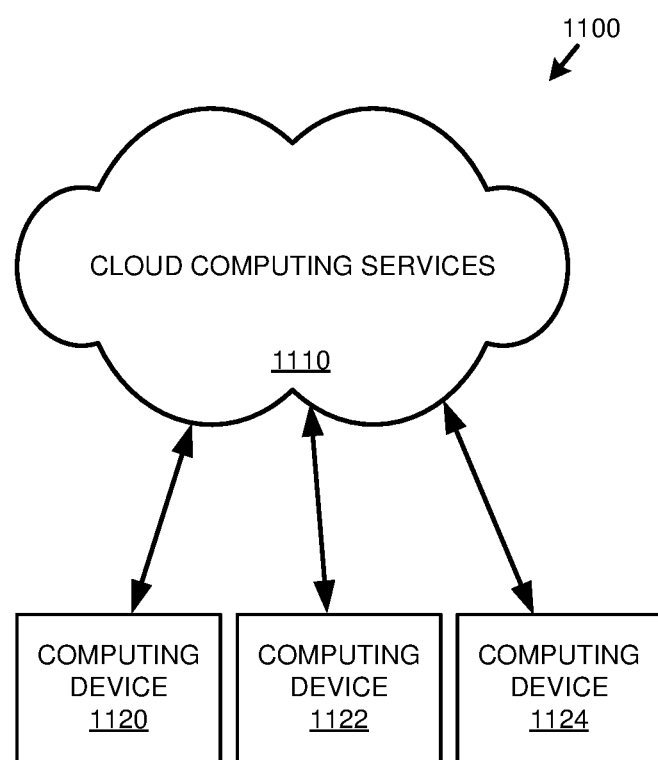
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operators (e.g., data processing, data storage, and the like).

Example 14

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C #, Java, Perl, JavaScript, Python, R, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented in a computing system, the method comprising:
   connecting a plurality of computing nodes in a plurality of loops, the connecting comprising connecting a first plurality of computing nodes selected from the plurality of computing nodes in a first loop and connecting a second plurality of computing nodes selected from the plurality of computing nodes in a second loop, where computing nodes comprise one or more processors and at least one memory coupled to the one or more processors, the first plurality of computing nodes of the first loop configured to operate at least one service configured to process tasks from one or more clients, wherein:
   (1) a given computing node of the first plurality of computing nodes of the first loop is connected to a left neighbor computing node and a right neighbor computing node of the first plurality of computing nodes, and wherein the first plurality of computing nodes of the first loop pass communications unidirectionally about the first loop;

(2) the first loop comprises at least a first connect node and at least a second connect node of the first plurality of computing nodes, wherein the at least first and second connect nodes pass messages to, or receive messages from, one or more loops of the plurality of loops, wherein the second loop is in communication with at least the at least a first connect node, the second loop comprising at least one computing node that is not a member of the first loop;

(3) the first loop comprises at least one normal node of the first plurality of nodes, wherein the at least one normal node is connected to the at least the first connect node and is not a member of a loop other than the first loop;

receiving a first task request from a first client device at a first computing node of the plurality of computing nodes;

determining that the first task request does not conflict with a task assigned to the first computing node;

sending the first task request to a first neighbor computing node of the first computing node in a direction of loop communication message passing, the first neighbor computing node being the left neighbor computing node or the right neighbor computing node of the first computing node;

determining if a node of the plurality of computing nodes other than the first computing node has a conflict with the first task request or does not have a conflict with the first task request, the determining whether a node has a conflict comprises: (1) the first computing node receives the first task request from a second neighbor node, the second neighbor node being a member of at least one loop of the plurality of loops, the at least one loop of the plurality of loops being a loop of the plurality of loops other than the first loop, and the receiving the first task request comprises an indication of whether a conflict was identified between the first task request and a computing node of the plurality of computing nodes other than the first computing node; or (2) the first task request is passed between multiple loops of the plurality of loops in the direction of loop communication message passing and the first computing node determines that no conflict exists with another computing node of the plurality of computing nodes if a notification is not received within a determined period of time; and executing the first task request.

2. The method of claim 1, further comprising:
prior to executing the first task request, determining from metadata associated with the first task request that another computing node of the first plurality of computing nodes of the first loop does not have a conflict with the task.

3. The method of claim 1, further comprising:
at a second computing node of the plurality of computing nodes, receiving a second task request from a first neighbor computing node of the second computing node, the first neighbor computing node being the left neighbor computing node or the right neighbor computing node of the second computing node;
determining that the second task request conflicts with the first task request; and
not forwarding the second task request to a second neighbor computing node of the second computing node, wherein when the first neighbor computing node is the left neighbor computing node the second neighbor computing node is the right neighbor computing node and when the first neighbor computing node is the right neighbor computing node the second neighbor computing node is the left neighbor computing node.

4. The method of claim 1, further comprising:
at a second computing node of the plurality of computing nodes, receiving a second task request from a first neighbor computing node of the second computing node, the first neighbor computing node being the left neighbor computing node or the right neighbor computing node of the second computing node;
determining that the second task request has a conflict with the first task request;
indicating the conflict in metadata associated with the second task request; and
passing the second task request to a second neighbor computing node of the second computing node, wherein when the first neighbor computing node is the left neighbor computing node the second neighbor computing node is the right neighbor computing node and when the first neighbor computing node is the right neighbor computing node the second neighbor computing node is the left neighbor computing node.

5. The method of claim 1, further comprising:
determining that a number of computing nodes exceeds a threshold based on loop performance parameters; and
causing at least one computing node to be removed from the first loop.

6. The method of claim 1, further comprising:
for a second computing node of the plurality of computing nodes, determining that a first neighbor node of the second computing node is not reachable, wherein the first neighbor node of the second computing node has the second computing node as a first neighbor node and a third computing node as a second neighbor node; and
changing the first neighbor node of the second computing node in the direction of loop communication message passing to the third computing node.

7. The method of claim 1, wherein computing nodes in the first loop communicate with only two other computing nodes in the first loop for purposes of passing task requests.

8. The method of claim 1, wherein a direction of loop communication message passing in the second loop is a reverse of the direction of loop communication message passing in the first loop.

9. The method of claim 1, wherein the first and second loops at least a part of a ribbon structure that optionally comprises one or more additional loops, wherein loops communicate through connect nodes unidirectionally in a direction of message passing for the ribbon structure, wherein a message sent by the first loop can traverse loops of the ribbon structure in the direction of message passing for the ribbon structure such that the first loop can receive the message after the message has passed through the other loops of the ribbon structure.

10. The method of claim 9, wherein each loop of the ribbon structure is associated with a unique hash range for hash values associated with a namespace for task requests.

11. The method of claim 9, the method further comprising:
determining, by the first computing node, that a hash range associated with the first loop should be altered;
updating the hash range associated with the first loop; and
communicating a hash range update to a computing node of the second loop, wherein the second loop updates the hash range of the second loop to conform with the updated hash range of the first loop.

12. The method of claim 9, wherein a hash value of a task is calculated from a concatenation of namespace tokens associated with a task.

13. The method of claim 1, wherein a hash value of a task is calculated from a concatenation of namespace tokens associated with a task, the namespace tokens comprising two or more of a tenant identifier, a service identifier, a region identifier, a service type, or a task type.

14. The method of claim 9, wherein each loop of the ribbon structure is associated with a unique hash range for hash values associated with a namespace for task requests and consistent hashing or rendezvous hashing is used.

15. The method of claim 1, wherein determining that the first task request does not conflict with a task assigned to the first computing node comprises:
  determining a hash value for the first task request, the hash value being calculated from a concatenation of two or more of a tenant identifier, a service identifier, a region identifier, a service type, or a task type associated with the first task request; and
  comparing the determined hash value with hash values for one or more tasks assigned to the first computing node.

16. A computing system that implements a high-availability task execution cluster, the computing system comprising:
  a plurality of computing nodes, a given computing node comprising at least one processor, one or more memories coupled to the at least one processor, and computer-executable instructions, stored in the one or more memories and executable on the at least one processor, for implementing at least one task execution service, the plurality of computing nodes comprising:
    at least a first connect node and at least a second connect node, wherein the at least first connect node and the at least a second connect node pass messages to, or receive messages from, at least a first loop and at least a second loop, wherein the at least a second loop comprises at least one computing node of the first plurality of computing nodes that is not a member of the at least a first loop; and
    at least one normal node, wherein the at least one normal node is connected to the at least the second connect node and is not a member of a loop other than the at least a second loop;
  a plurality of loops, the plurality of loops comprising the at least a first loop and the at least a second loop, a given loop of the plurality of loops formed from a first plurality of computing nodes of the plurality of computing nodes, wherein computing nodes within a given loop of the plurality of loops are connected to a pair of other computing nodes in the given loop and pass messages unidirectionally within the given loop; and
  at least a first ribbon formed from the plurality of loops, wherein a given loop of the plurality of loops comprises a first connect node of the first plurality of computing nodes that is in communication with a second connect node of the first plurality of computing nodes of an adjacent loop in a unidirectional message passing direction, and wherein at least a portion of nodes of the plurality of computing nodes are configured to pass task requests in the unidirectional message passing direction such that a first node of a first loop of the plurality of loops that receives a task request from a client device passes the task request in the unidirectional message passing direction such that the task request passes through multiple loops of the plurality of loops and (1) the first node subsequently receives the task request from another node of the plurality of computing nodes that is a member of at least one loop of the plurality of loops, the at least one loop being a loop other than the first loop, and the task request is received by the first node with an indication of whether a conflict was identified between the task request and a node of the plurality of computing nodes other than the first node; or (2) the first node determines that no conflict exists with another node of the plurality of computing nodes if a notification is not received within a determined period of time.

17. The computing system of claim 16, wherein the plurality of loops in the at least a first ribbon are a first plurality of loops, further comprising:
  at least a first prism formed from the at least a first ribbon and at least a second ribbon comprising a second plurality of loops, wherein the at least a first ribbon and the at least a second ribbon communicate via computing nodes of the first plurality of computing nodes in respective loops of the at least a first ribbon and the at least a second ribbon.

18. The computing system of claim 16, wherein the computing system is configured to perform operations comprising:
  determining a hash value for a first task request received by a computing node of the plurality of computing nodes, the hash value being calculated from a concatenation of two or more of a tenant identifier, a service identifier, a region identifier, a service type, or a task type associated with the first task request; and
  comparing the determined hash value with hash values for one or more tasks assigned to the first computing node.

19. One or more computer-readable storage media comprising computer-executable instructions that, when loaded into a memory of a computing device and executed on a processor of the computing device, perform operations for implementing a computing environment for executing tasks of client devices, the operations comprising:
  forming a ribbon comprising multiple loops and having at least one unidirectional communication pathway, a given loop of the multiple loops comprising a plurality of computing nodes having a unidirectional communication pathway between computing nodes of the given loop, wherein the unidirectional communication pathway is reversed between adjacent loops, and a namespace is divided into ranges using consistent hashing and a unique range of the ranges is assigned to given loops of the multiple loops, wherein at least a first loop of the multiple loops comprises (1) at least first a first connect node and at least a second connect node of the plurality of computing nodes, wherein the first a first connect node and the at least a second connect node pass messages to, or receive messages from, one or more loops other than the at least a first loop, the one or more loops other than the at least a first loop comprising a second loop in communication with at least the first connect node, the second loop comprising at least one computing node that is not a member of the plurality of computing nodes of the at least a first loop; and (2) the at least a first loop comprises at least one normal node of the plurality of computing nodes of the at least a first loop, wherein the at least one normal node is connected to the at least the first connect node and is not a member of a loop other than the at least a first loop; and with a receiving computing node of a loop of the multiple loops:
  receiving a task request;
  determining that the task request does not conflict with a task assigned to the receiving computing node;
  sending the task request to a first neighbor computing node in a direction of message passing for a loop of which the receiving computing node is a member;
  determining if a node of the plurality of computing nodes other than the receiving computing node has a conflict with the task request or does not have a conflict with the task request, the determining whether a node has a conflict comprises: (1) the receiving computing node receives the task request from a second neighbor node, the second neighbor node being a member of at least one loop of the multiple loops other than, or in addition to, a loop of which the receiving computing node is a member, and the receiving the task request comprises an indication of whether a conflict was identified between the task request and a node of the plurality of computing nodes other than the receiving computing node; or (2) the task request is passed between two or more loops of the multiple loops in the direction of message passing and the receiving computing node determines that no conflict exists with another node of the plurality of computing nodes of the two or more loops if a notification is not received within a determined period of time; and
  in response to receiving the task request from the second neighbor node, executing the task request.

20. The computing system of claim 18, wherein each loop of the first ribbon is associated with a unique hash range for hash values associated with a namespace for task requests.

* * * * *